United States Patent
Meade et al.

(10) Patent No.: US 9,235,097 B2
(45) Date of Patent: Jan. 12, 2016

(54) ACTIVE ALIGNMENT OF OPTICAL FIBER TO CHIP USING LIQUID CRYSTALS

(75) Inventors: Roy Meade, Boise, ID (US); Gurtej Sandhu, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 200 days.

(21) Appl. No.: 13/365,856

(22) Filed: Feb. 3, 2012

(65) Prior Publication Data

US 2013/0202246 A1 Aug. 8, 2013

(51) Int. Cl.
| | | |
|---|---|---|
| *G02B 6/32* | (2006.01) | |
| *G02F 1/139* | (2006.01) | |
| *G02F 1/29* | (2006.01) | |
| G02B 6/30 | (2006.01) | |
| G02B 6/34 | (2006.01) | |
| G02B 6/124 | (2006.01) | |
| G02F 1/13363 | (2006.01) | |

(52) U.S. Cl.
CPC .............. *G02F 1/1393* (2013.01); *G02F 1/292* (2013.01); *G02B 6/124* (2013.01); *G02B 6/30* (2013.01); *G02B 6/34* (2013.01); *G02F 2001/133638* (2013.01); *G02F 2203/24* (2013.01)

(58) Field of Classification Search
CPC .................. G02F 1/1391; G02F 1/292; G02F 2001/133638; G02F 2203/24; G02B 6/30; G02B 6/34; G02B 6/124
USPC .............................................. 385/33; 349/202
See application file for complete search history.

(56) References Cited

U.S. PATENT DOCUMENTS

| | | | | |
|---|---|---|---|---|
| 4,525,874 A | * | 6/1985 | Baues | 398/168 |
| 4,707,137 A | * | 11/1987 | Lee | 356/520 |
| 4,859,017 A | * | 8/1989 | Brierley et al. | 385/27 |
| 5,216,729 A | | 6/1993 | Berger et al. | |
| 6,072,920 A | * | 6/2000 | Ando et al. | 385/11 |
| 6,115,514 A | | 9/2000 | Ando et al. | |
| 6,264,111 B1 | * | 7/2001 | Nicolson et al. | 236/51 |
| 6,744,948 B1 | * | 6/2004 | Pi et al. | 385/30 |
| 6,870,978 B2 | * | 3/2005 | Purchase et al. | 385/14 |
| 7,058,249 B2 | * | 6/2006 | Purchase et al. | 385/14 |
| 7,151,870 B2 | | 12/2006 | Gu et al. | |
| 7,162,124 B1 | | 1/2007 | Gunn, III et al. | |
| 7,298,941 B2 | | 11/2007 | Palen et al. | |
| 7,324,286 B1 | * | 1/2008 | Glebov et al. | 359/652 |
| 7,636,502 B2 | * | 12/2009 | Mao et al. | 385/12 |
| 2002/0075783 A1 | * | 6/2002 | Alon et al. | 369/112.02 |

(Continued)

FOREIGN PATENT DOCUMENTS

| | | |
|---|---|---|
| EP | 2 267 500 A2 | 12/2010 |
| WO | WO/2011/014743 | 2/2011 |

OTHER PUBLICATIONS

J. Kim, C. Oh, M. J. Escuti, L. Hosting, and S. Serati, "Wide-angle nonmechanical beam steering using thin liquid crystal polarization gratings," Proc. SPIE 7093, 709302 (2008).*

(Continued)

*Primary Examiner* — Peter Radkowski
(74) *Attorney, Agent, or Firm* — Perkins Coie LLP

(57) ABSTRACT

Devices and systems to perform optical alignment by using one or more liquid crystal layers to actively steer a light beam from an optical fiber to an optical waveguide integrated on a chip. An on-chip feedback mechanism can steer the beam between the fiber and a grating based waveguide to minimize the insertion loss of the system.

27 Claims, 6 Drawing Sheets

(56) References Cited

U.S. PATENT DOCUMENTS

| | | | | |
|---|---|---|---|---|
| 2002/0131698 | A1* | 9/2002 | Wilde | 385/31 |
| 2002/0131699 | A1* | 9/2002 | Raguin et al. | 385/33 |
| 2003/0151704 | A1* | 8/2003 | Kawamoto et al. | 349/96 |
| 2004/0013337 | A1* | 1/2004 | Purchase et al. | 385/14 |
| 2004/0022282 | A1* | 2/2004 | Lano et al. | 372/32 |
| 2004/0256687 | A1* | 12/2004 | Omori | 257/433 |
| 2005/0007639 | A1* | 1/2005 | Natarajan et al. | 359/15 |
| 2005/0041920 | A1* | 2/2005 | Gu et al. | 385/31 |
| 2005/0100265 | A1* | 5/2005 | Purchase et al. | 385/14 |
| 2007/0019152 | A1* | 1/2007 | Caputo et al. | 349/192 |
| 2007/0147727 | A1* | 6/2007 | Mao et al. | 385/12 |
| 2010/0098379 | A1* | 4/2010 | Kopp et al. | 385/37 |
| 2010/0329603 | A1* | 12/2010 | Kopp | 385/14 |
| 2011/0188120 | A1* | 8/2011 | Tabirian et al. | 359/573 |
| 2011/0262844 | A1* | 10/2011 | Tabirian et al. | 430/2 |
| 2012/0188467 | A1* | 7/2012 | Escuti et al. | 349/1 |
| 2013/0236817 | A1* | 9/2013 | Tabirian et al. | 430/2 |
| 2014/0092373 | A1* | 4/2014 | Tabirian et al. | 355/71 |

OTHER PUBLICATIONS

J. Kim, C. Oh, S. Serati, and M. Escuti, "Wide-angle, nonmechanical beam steering with high throughput utilizing polarization gratings," Appl. Opt. 50, 2636-2639 (2011).*

L. Wei, J. Weirich, T. Alkeskjold, and A. Bjarklev, "On-chip tunable long-period grating devices based on liquid crystal photonic bandgap fibers," Opt. Lett. 34, 3818-3820 (2009).*

Frederik Van Laere, et al; "Compact and Highly Efficient Grating Couplers Between Optical Fiber and Nanophotonic Waveguides"; Journal of Lightwave Technology; vol. 25; No. 1; Jan. 2007; pp. 151-156.

Corning SMF-28e Optical Fiber Product Information; Optical Fiber; Evolving Networks Now; Dec. 2007; website: http://www.google.com/url?q=http://www.corning.com/assets/0/433/573/583/09573389-147D-4CBC-B55F 18C817D5F800.pdf&sa=U&ei=dVzATaXyFlySuwOyi_G1BA&ved=0CA8QFjAB&usg=AFQjCNFoeLLIOzaT7ggD5TxcGm2JC2PrEw; pp. 1-4.

Corning HI 1060 Flex & RC HI1060 Flex; Specialty Optical Fibers High Index/Bend Insensitive; "High performance WDM components and ultra-low bend loss applications"; Mar. 2010; website: http://www.google.com/url?q=http://www.corning.com/WorkArea/downloadasset.aspx%3Fid%3D14719&sa=U&ei=D1zATdWEF42-vgPKpoi8BA&ved=0CBAQFjAA&usg=AFQjCNHFVWt7FrE7OXxxFaLN4XwtYIPRAQ; pp. 1-2.

Qing Xin Zhang, et al; "A Silicon Platform With MEMS Active Alignment Function and Its Potential Application in Si-Photonics Packaging"; IEEE Journal of Selected Topics in Quantum Electronics; vol. 16; No. 1; Jan./Feb. 2010; pp. 267-275.

M. Epitaux, et al.; "Micro-Machined XY Stage for Fiber Optics Module Alignment"; Optical Fiber Communication Conference and Exposition and The National Fiber Optic Engineers Conference; Technical Digest (CD); Optical Society of America; 2005; paper OThD2; pp. 1-3.

Jihwan Kim, et al; "Wide-angle, nonmechanical beam steering using thin liquid crystal polarization gratings"; Proc. of SPIE vol. 7093 709302; pp. 1-12.

Douglas H. Werner, et al; "Liquid crystal clad near-infrared metamaterials with tunable negative-zero-positive refractive indices"; Optics Express; vol. 15; No. 6; Mar. 19, 2007; pp. 3342-3347.

"Polarization-maintaining optical fiber"; Feb. 9, 2012; website: http://en.wikipedia.org/wiki/Polarization-maintaining_optical_fiber; pp. 1-2.

Katsuhiko Hirabayashi, et al; "Optical Beam Direction Compensating System for Board-to-Board Free Space Optical Interconnection in High-Capacity ATM Switch"; Journal of Lightwave Technology, vol. 15; No. 5; May 1997; pp. 874-882.

G. Roelkens, et al.; "High efficiency diffractive grating couplers for interfacing a single mode optical fiber with a nanophotonic silicon-on-insulator waveguide"; Applied Physics Letters 92; 131101 (2008); pp. 1-3.

Michael J. Escuti, et al.; "A Polarization-Independent Liquid Crystal Spatial Light Modulator"; Liquid Crystals X; edited by Lam-Choon Khoo; Proc. of SPIE; vol. 6332; 63320M (2006); pp. 1-8.

Dirk Taillaert, et al.; "Compact efficient broadband grating coupler for silicon-on-insulator waveguides"; Optical Society of America; Optical Letters; vol. 29; No. 23; Dec. 1, 2004; pp. 2749-2751.

Koji Ishikwaw, et al.; "An Integrated Micro-Optical System for VCSEL-to-Fiber Active Alignment"; Sensors and Actuators A 103; 2003; pp. 109-115.

Wim Bogaerts; "Lecture: Coupling Light to Silicon Photonic Circuits"; Nov. 2009; pp. 1-113.

* cited by examiner

ACTIVE ALIGNMENT OF OPTICAL FIBER TO CHIP USING LIQUID CRYSTALS

FIELD OF THE INVENTION

Embodiments of the invention relate to optical interconnects for chip-to-chip and intra-chip communication, and specifically directed to devices and systems for actively coupling a fiber to an optical waveguide on a silicon based photonic-integrated-chip.

BACKGROUND OF THE INVENTION

Optical transmission may be used as a means for communication between separate integrated circuit chips (inter-chip connections) and within components on the same chip (intra-chip connections). In chip-to-chip communication via optical interconnects, each chip on the circuit board is interfaced with a transmitter-receiver optoelectronic chip, and the two optoelectronic chips are connected via a planar dielectric waveguide. Likewise, optical waveguides may be used to connect components within a chip, such as between an integrated optical source and a detector. An integrated optical waveguide is an optical path formed on a semiconductor, e.g., silicon substrate, using lithographic processing. The waveguide can be made of an inorganic crystal or semiconductor material having a higher index of refraction than the chip substrate to guide optical signals from an input optical fiber to an output optical fiber or other optical circuitry on the chip.

Light can be transmitted through an optical waveguide in one, two or many modes. Each mode travels along the axis of the waveguide with a distinct propagation constant and group velocity. A mode is described as approximately the sum of the multiple reflections of a Transverse ElectroMagnetic (TEM) wave reflecting within the core in the direction of an optical ray for all angles greater than the critical angle of total reflection, where the condition of total reflection is:

$$\theta \geq \theta_c = \sin^{-1}\left(\frac{\eta_2}{\eta_1}\right), \text{ where } \theta_c = \text{critical angle,}$$

$\eta_2$ = index of cladding, and $\eta_1$ = index core.

When the core diameter of an optical fiber is small, only a single mode is supported and the fiber is said to be a single-mode fiber. Alignment of a single-mode fiber to an integrated optical waveguide (and vice versa) is one of the most expensive and time-consuming manufacturing processes in the packaging of semiconductor photonics. Moreover, the large difference in dimensions between a single-mode fiber (e.g., 5-9 μm diameter core) and the cross section of a waveguide on a chip (e.g., 2 μm to less than 200 nm) causes high insertion losses and packaging costs.

FIGS. 1A and 1B respectively show a perspective view and a partial cross-sectional view of a grating based vertical coupler system as described in Frederik Van Laere, et al., "Compact and Highly Efficient Grating Couplers Between Optical Fiber and Nanophotonic Waveguides," JOURNAL OF LIGHTWAVE TECHNOLOGY, Vol. 25, No. 1, January 2007. The grating based vertical coupler can be used for out-of-plane coupling between a single-mode fiber 110 and a waveguide 170 of a photonic-integrated-chip 120. As shown in FIG. 1A, the grating based vertical coupler includes a grating 100, an adiabatic taper 130 and a photonic waveguide 140 (discussed below). Referring to FIG. 1B, the waveguide 170 can be a silicon-on-insulator (SOI) waveguide made of a 220 nm thick silicon core on top of a buried oxide layer 180 on a silicon substrate 190. The grating 100 is etched into the waveguide 170 with a plurality of grating grooves 101 (e.g., twenty (20) grooves), which are invariant in the x direction. A refractive index-matching material 160 is bonded to the waveguide 170. The index-matching material 160 is not shown in FIG. 1A in order to show the optical components beneath the index-matching material 160. The refractive index of the index-matching material 160 is 1.46 to match the refractive index of the cladding of the fiber 110. The end facet of the fiber 110 is positioned close to the grating 100. The fiber 110 is slightly tilted at an angle θ of about 8 degrees to avoid reflection at the grating 100. The waveguide 170 has a finite width of about 10 μm, whereas the photonic waveguide 140 is about 0.56 μm wide. The adiabatic taper 130 is used to couple the broad waveguide 170 and the narrow photonic waveguide 140, which sends the beam to an integrated chip 150 or other optical circuitry. The grating based vertical coupler of FIGS. 1A and 1B requires the precise positioning of the fiber 110 to the grating 100 that is etched in the waveguide 170. During field operation, temperature variations, vibrations, and other environmental perturbations can cause post-bonding shifting that can adversely affect the alignment of the fiber 110 with the grating 100, resulting in insertion loss.

Other approaches for coupling an optical fiber to a chip waveguide include using microelectromechanical systems (MEMS) to align optical fibers to chips. These techniques have an added cost of requiring active MEMS alignment components and the added difficulty in fabricating and packaging the system. Accordingly, there is a need for a simplified device and system for actively aligning an optical fiber to an optical waveguide integrated on a photonics chip.

DETAILED DESCRIPTION OF THE INVENTION

In the following detailed description, reference is made to the accompanying drawings which form a part hereof, and in which is shown by way of illustration specific embodiments that may be practiced. It should be understood that like reference numbers represent like elements throughout the drawings. These embodiments are described in sufficient detail to enable those skilled in the art to make and use them, and it is to be understood that structural, material, electrical, and procedural changes may be made to the specific embodiments disclosed, only some of which are discussed in detail below.

Described herein are embodiments of devices and systems to perform optical alignment by using one or more liquid crystal layers to actively steer a light beam from an optical fiber to an optical waveguide (and vice versa) integrated on a photonics chip (hereinafter "integrated optical waveguide"). An on-chip feedback mechanism can steer the beam between the fiber and a grating based waveguide to minimize the insertion loss of the system. The liquid crystal based steering devices are bonded on an integrated-photonic-chip to enable chip-to-chip and intra-chip communication.

Figure 1A:
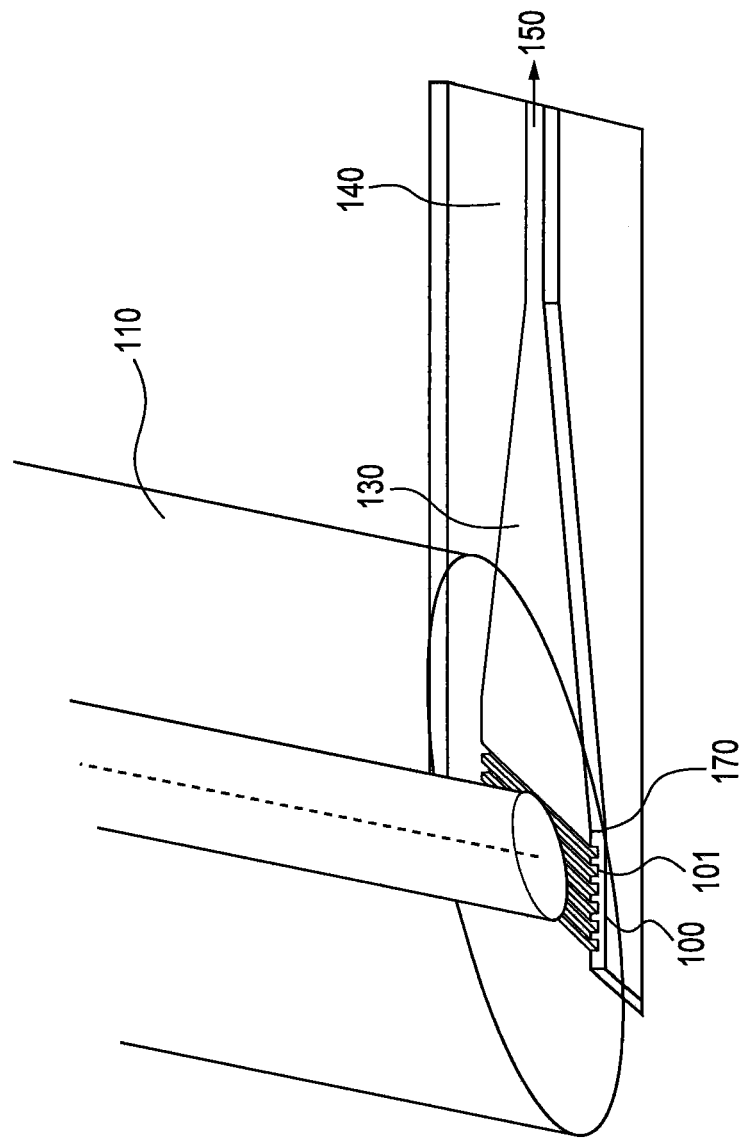
FIGS. 1A and 1B respectively show a perspective view and a partial cross-sectional view of a grating based vertical coupler system.
Figure 1B:
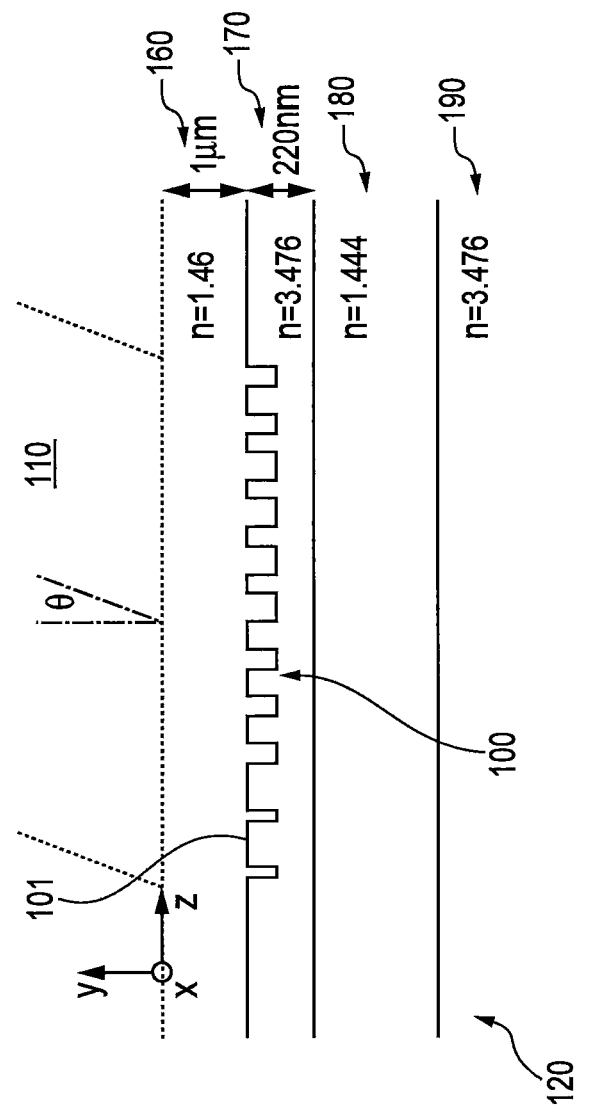
Figure 2A:
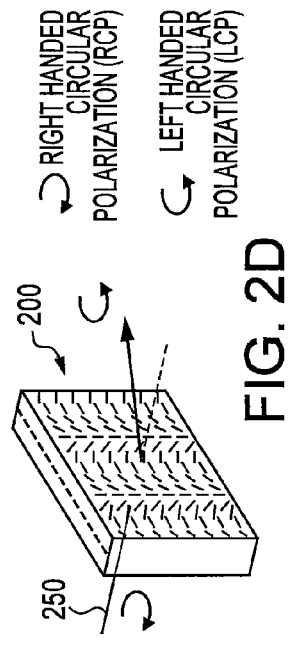
FIGS. 2A and 2B respectively show a top view and a side view of a liquid crystal polarization grating.
Figure 2B:
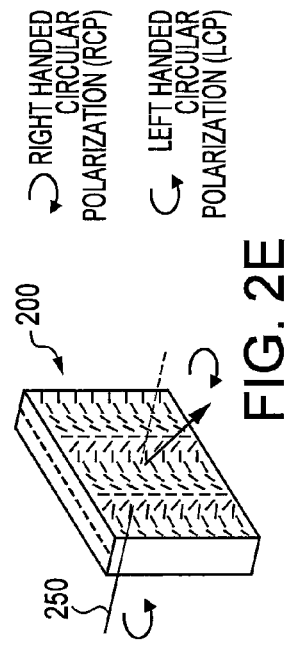
Figure 2C:
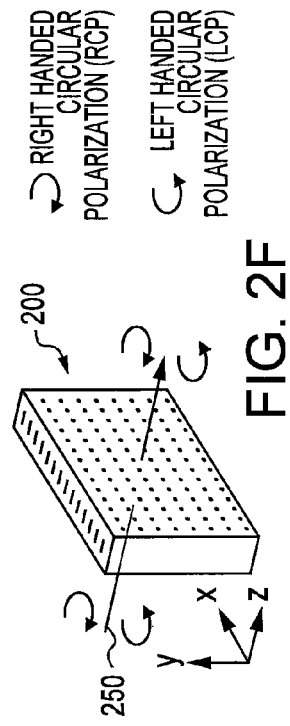
FIG. 2C shows a side view of the liquid crystal polarization grating of FIG. 2B in a high voltage state.
Figure 2D:
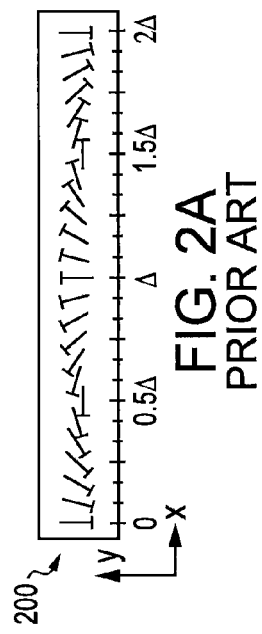
FIGS. 2D and 2E respectively show the diffraction behavior of circularly polarized incident light transmitted through the liquid crystal polarization grating of FIG. 2B.
Figure 2E:
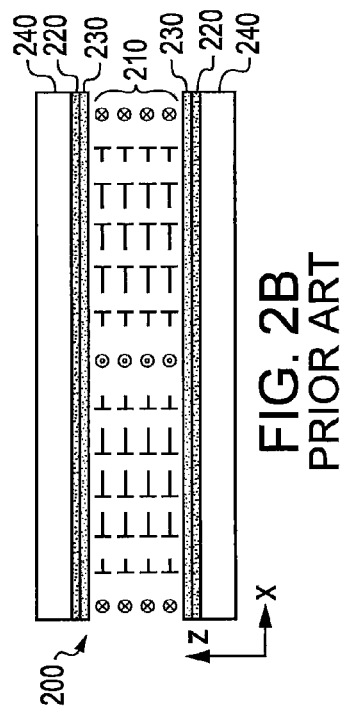
Figure 2F:
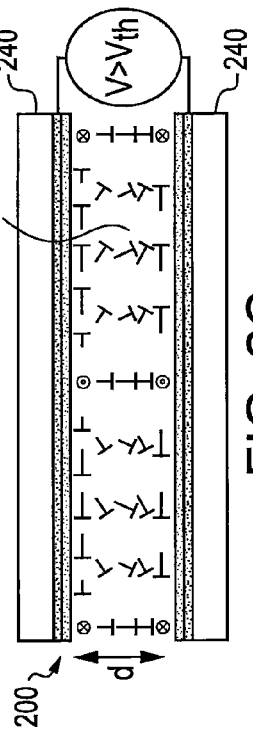
FIG. 2F shows a zero order diffraction direction for the liquid crystal polarization grating of FIG. 2C.

A liquid crystal wide-angle steering system for LIDAR (Light Detection And Ranging) and SLM (Spatial Light Modulator) applications is described in Jihwan Kim, et al., "Wide-angle, nonmechanical beam steering using thin liquid crystal polarization gratings," Proc. Of SPIE Vol. 7093 (2008) and International Application Number PCT/US2010/043861 (Publication Number WO 2011/014743 A2), filed on Jul. 30, 2010. As shown in FIGS. 2D to 2F, a liquid crystal polarization grating (LCPG) 200 can actively steer a beam in two dimensions. A polarization grating (PG), also called an anisotropic grating, is classified as a nematic liquid crystal (LC) film with a continuous periodic pattern. It operates by modulating the polarization state of light passing through, and is embodied as a spatially varying birefringence. The LCPG steering module 200 is an in-plane, uniaxial birefringence that varies with position, $$n(x)=[\sin(\pi x/\Lambda), \cos(\pi x/\Lambda), 0],$$

where $\Lambda$ is the grating period. The LCPG 200 is fabricated by interfering two orthogonally circular-polarized ultraviolet laser beams that are superimposed with a small angle between them, leading to an interference pattern with constant intensity and a periodically varying linear polarization state that follows FIG. 2A with a period of $\Lambda=\lambda_R/2 \sin\theta$, where $\lambda_R$ is the recording wavelength and $\theta$ is the half the angle between the beams. Two glass substrates 240 with indium-tin-oxide (ITO) 220 electrodes are coated with a photo-alignment material 230, and laminated together such that a uniform thickness is maintained by an edge seal of glue. This structure is then exposed by the polarization hologram capturing the pattern in the photo-alignment material 230. A nematic liquid crystal 210 fills the gap by capillary action and the desired LCPG 200 is formed.

The birefringence of the nematic liquid crystals 210 is produced by the rotation of the liquid crystal molecules under an applied voltage, for example, 1 V to 2 V. FIGS. 2A and 2B respectively show the top view and the side view of the nematic liquid crystals 210 in an off state, i.e., without voltage applied. When no electric field is applied, a twisted configuration of nematic liquid crystal 210 is formed between the two glass substrates 240. The photo-alignment materials 230 create forces that precisely twist the liquid crystal 210 by 90 degrees in the absence of an electric field. An electric field can cause the liquid crystal to reorient itself with the field, thereby inducing birefringence. FIG. 2C shows a side view of the nematic liquid crystals 210 with voltage applied. The applied voltage breaks the twist in the liquid crystal 210. At voltages near a threshold voltage, only some of the liquid crystals will realign. As the applied voltage is increased, more of the liquid crystals will realign until it becomes completely "switched." Therefore, it is possible to change the index of refraction of a liquid crystal for light of a given polarization with an applied voltage.

Referring to FIGS. 2D through 2F, incident light 250 can be steered or deflected into one of three diffraction orders (zero ($0^{th}$) and first ($\pm 1^{st}$) diffraction orders) according to the handedness of the incident light and the voltage applied to the LCPG 200. After the light 250 passes through the LCPG 200, the handedness of the circular polarized light will be changed to the opposite state since the light experiences a relative phase shift due to the liquid crystal layer. When the incident light 250 is right-handed circularly polarized (RCP), all of the light passing through the LCPG 200 is changed to the left-handed circular polarization (LCP) and diffracted into the positive first order as shown in FIG. 2D. When the incident light 250 is left-handed circularly polarized, all of the light passing through the LCPG 200 is changed to the right-handed circular polarization and diffracted into the negative first order as shown in FIG. 2E. An applied voltage greater than a threshold voltage ($V>V_{th}$), for example, 1.65V, can effectively erase the polarization grating causing the light to pass directly through the LCPG 200 as shown in FIGS. 2C and 2F. The diffraction angle $\theta_m$ of the light passing through the LCPG 200 is determined by $$\sin\theta_m = \frac{m\lambda}{\Lambda} + \sin\theta_{in},$$

where $\theta_m$ is the incident angle and m is the diffraction order ($-1^{st}, 0^{th}, +1^{st}$). At a wavelength of 1550 nm, for example, the grating period $\Lambda$ of the LCPG 200 needs to be 8.93 μm to perform a 10 degree diffraction angle.

Figure 3A:
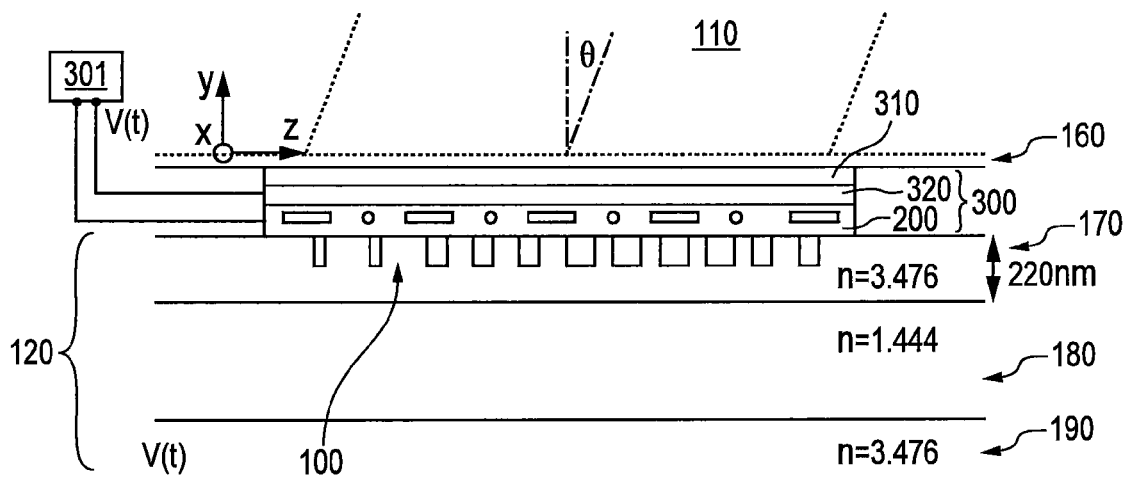
FIG. 3A shows a side view of a liquid crystal steering device for active fiber to chip alignment in accordance with a first embodiment.
Figure 3B:
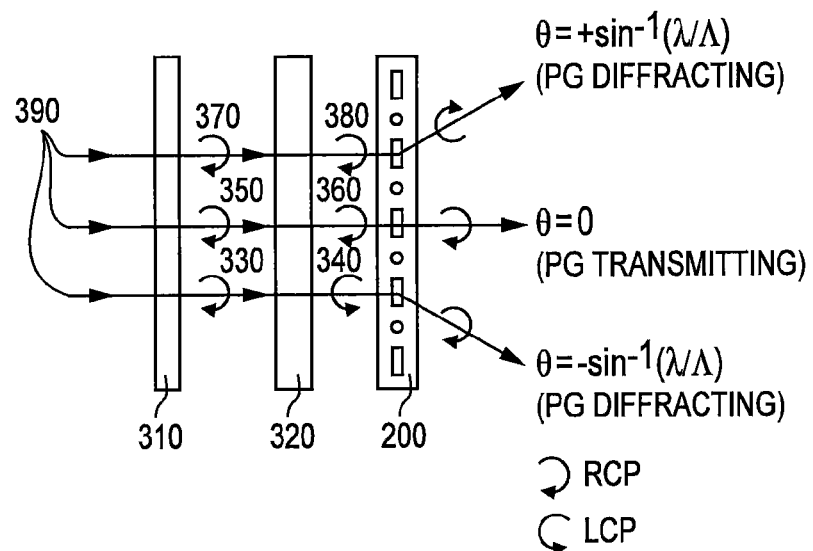
FIG. 3B shows the diffraction and transmission behavior of incident light on the steering device of FIG. 3A.

FIG. 3A shows a side view of a liquid crystal steering device 300 for active alignment of an optical fiber 110 to a waveguide 170 integrated into the chip 120 in accordance with an embodiment of the invention. The z-direction is along the length of the waveguide 170, the y-direction is perpendicular to the liquid crystal steering device 300 (transverse direction), and the x-direction points upward out of the page (lateral direction). The optical fiber 110 can be a polarization maintaining fiber (e.g., Panda, 3M's Tiger, Bow-Tie, etc.). FIG. 3B shows the diffraction and transmission behavior of incident light on the liquid crystal steering device 300. The liquid crystal steering device 300 is bonded between an index matching layer 160 and a waveguide 170 using, for example, double-sided tape adhesive. It should be appreciated that the embodiment is not limited solely to double-sided tape and that any suitable adhesive technique may be used.

As shown in FIG. 3A, the liquid crystal steering device 300 includes: a switchable LCPG 200 that is arranged in an optical path with the waveguide 170; a half waveplate 320 that is located above and arranged in line with the LCPG 200; and a quarter waveplate 310 that is located above and arranged in line with the half waveplate 320. Referring to FIG. 3B, the quarter waveplate 310 operates to convert linearly polarized light 390 from the fiber 110 into circularly polarized light 330, 350, 370. The half waveplate 320 operates to switch the handedness of the incoming circular polarized light 330, 350, 370. The switchable LCPG 200 operates to steer the circularly polarized light 340, 360, 380 into the zero- and/or first-order diffraction orders as described above.

Since light directly from lasers are typically linearly polarized, a quarter waveplate 310 or a three-quarter waveplate (e.g., λ/4 or 3λ/4 liquid crystal waveplate) with an axis of ±45 degrees to the input polarization can be inserted between the polarization maintaining fiber 110 (e.g., Panda, 3M's Tiger, Bow-Tie, etc.) and the half waveplate 320 to convert the linearly polarized light 390 into the circularly polarized light 330, 350, 370. For convenience, we assume the quarter waveplate 310 converts the linearly polarized light 390 into right-handed circularly polarized light 330, 350, 370 as shown in FIG. 3B. It should be appreciated that the quarter waveplate 310 can also convert the linearly polarized light 390 into left-handed circularly polarized light. A facet of the quarter waveplate 310 facing the optical fiber 110 can be coated with an antireflective coating.

The half waveplate 320 made of a birefringent liquid crystal, for example, is used to alter the polarization state of light traveling through it. The half waveplate 320 is bonded to the LCPG 200 using double-sided tape adhesive, although any suitable adhesive technique may be used. If the incoming circular polarized light is right-handed circularly polarized 330 then the half waveplate 320 will change its state to left-handed circular polarization 340, and vice versa. Under external applied voltage V(t) from a voltage supply 301, however, the half waveplate 320 allows the incoming light 350, 370 from a quarter waveplate 310 to pass through the half waveplate 320 without changing its polarization state. The switching properties of the half waveplate 320 rely mainly on the reorientation of the liquid crystal molecules as described above in connection with FIGS. 2A to 2C.

Referring to FIG. 3B, the circularly polarized light 340, 360, 380 can be steered or deflected into one of three diffraction orders (zero ($0^{th}$) and first ($\pm 1^{st}$) diffraction orders) according to the handedness of the circularly polarized light 340, 360, 380 and the voltage V(t) applied to the LCPG 200. For example, when the liquid crystal steering device 300 is directed by a controller (explained below) to steer the light 390 from the fiber 110 at an angle θ in the positive first ($+1^{st}$) order, the voltage V(t) (e.g., 2V) from the voltage supply 301 is applied to the half waveplate 320 so that the light 370 passes through the half waveplate 320 without changing its polarization state and no voltage is applied to the LCPG 200 to steer the light 380 in the $+1^{st}$ order. When the liquid crystal steering device 300 is directed by the controller to steer the light at an angle θ in the $-1^{st}$ order, no voltage is applied to the half waveplate 320 so that the light 330 switches its handedness (e.g., switch right-handed circular polarization (RCP) to left-handed circular polarization (LCP)) and no voltage is applied to the LCPG 200 to steer the light 340 in the $-1^{st}$ order. When the liquid crystal steering device 300 is directed by the controller to stop steering, the voltage V(t) (e.g., 2V) from the voltage supply 301 is applied to the half waveplate 320 so that the light 390 passes through the half waveplate 320 without changing its polarization state and the voltage V(t) is applied to the LCPG 200 to steer the light 360 in the $0^{th}$ order. Thus, the liquid crystal steering device 300 can be used to select the steering direction into one of the zero and first orders by simply switching the half waveplate 320 and the LCPG 200.

Figure 4:
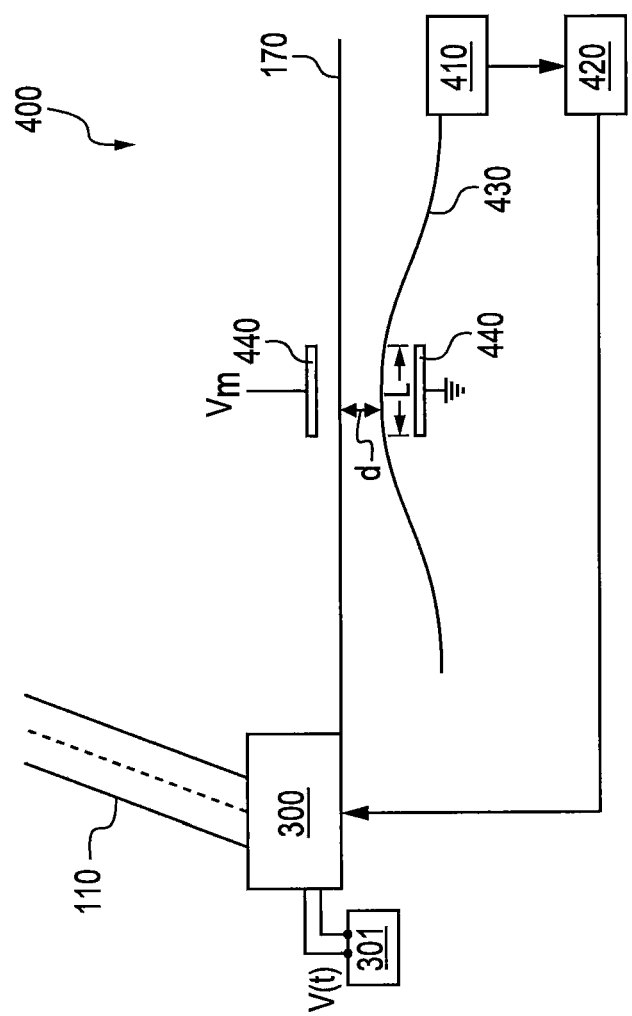
FIG. 4 shows a fiber to chip steering system incorporating the steering device of FIG. 3A.

FIG. 4 shows a fiber to chip steering system 400 incorporating the liquid crystal steering device 300 for coupling the fiber 110 to the integrated optical waveguide 170. The steering system 400 includes a light detector 410, a proportional-integral-derivative (PID) controller 420 and a second waveguide 430 that is parallel over some of the length to the input waveguide 170 for a transmission distance (L). The cores of the two waveguides 170, 430 come within the approximate coupling distance (d) for evanescent coupling. A light signal is transferred between the waveguides 430, 170 by the evanescent coupling.

Referring to FIG. 4, a voltage Vm can be applied to the waveguide 430 using electrodes 440 to change the refractive index of the waveguide 430 and thereby adjust the strength of the optical coupling between the waveguide 170 and the waveguide 430. The waveguide 430 is formed of an electro-optic material such as, a crystal, for example, potassium dihydrogen phosphate (commonly called KDP), whose index is adjustable by an applied electric field. It should be appreciated that the waveguide 430 can be formed of other various materials in which their refractive index is adjustable, such as a magnetic-optic material whose index is adjustable by an applied magnetic field. When a voltage Vm is applied to the waveguide 430, for example, using electrodes 440, the resulting electric field alters the refractive index of the waveguide 430, which in turn permits some of the optical power in the input waveguide 170 to stay in the waveguide 170. For a sufficiently high voltage, all the optical power in the input waveguide 170 will ideally remain in the waveguide 170. The voltage needed to go from full evanescent coupling to zero coupling is called the switching voltage, Vs. Therefore, it shall be appreciated that an applied voltage Vm can be used to alter the refractive index of the waveguide 430 to adjust the amount of transfer power or a switching voltage Vs can be determined for a given wavelength to turn on/off the transfer of power between the waveguides 170 and 430.

The optical power between the fiber 110 and the input waveguide 170 can be sensed at various diffraction angles of the LCPG 200 using the light detector 410. As explained above, at a wavelength of 1550 nm and a grating period Λ of 8.93 µm, the LCPG 200 can perform a 10 degree diffraction angle. The optical power coupled between the fiber 110 and the input waveguide 170 can be measured at every diffraction angle ranging from 0 degree to 10 degree to determine a maximum sensed optical power. The maximum sensed optical power is determined at the diffraction angle of the LCPG 200 when the optical power between the fiber 110 and the input waveguide 170 is the greatest. It should be appreciated that the optical power may be measured for any number of degrees such as, for example, every half degree from 0 degree to 10 degree to determine the maximum sensed optical power. The maximum sensed optical power for the corresponding diffraction angle, wavelength and grating period is stored as an operating parameter of the steering system 400.

The second waveguide 430 is used to actively monitor the intensity of the coupled optical power between the fiber 110 and the input waveguide 170. The optical power coupled to the second waveguide 430 is monitored and acts as feedback to actively align the fiber 110 to the waveguide 170 using the steering device 300. The light detector 410 senses the optical power coupled into the second waveguide 430 via evanescent coupling and converts the sensed optical power into a detector signal. The light detector 410 can be a germanium photodetector, although other detectors can be used. It will be appreciated that other waveguide sensors, such as an optical transducer coupled to the waveguide 170, can also be used to detect the coupling power between the fiber 110 and the waveguide 170. The detector signal converted by the light detector 410 is input as a process variable into a proportional-integral-derivative (PID) controller 420, although other closed loop control systems can be used. In response to the detector signal converted by the light detector 410, the feedback loop generates an error signal that indicates a difference between the currently sensed optical power as represented by the detector signal and the stored maximum sensed optical power.

When the PID controller 420 determines that the error signal is below a desired error threshold, the liquid crystal steering device 300 is directed to steer the diffraction angle to the zero ($0^{th}$) diffraction angle. As explained above, to accomplish this, an applied voltage V(t) from the voltage supply 301 is applied to the half waveplate 320 so that the light 390 from the fiber 110 passes through the half waveplate 320 without changing its polarization state. An applied voltage V(t) from the voltage supply 301 is also applied to the LCPG 200 to steer the light into the zero-order.

When the PID controller 420 determines that the error signal is equal to or above a desired error threshold, the PID controller 420 steers the light from the fiber 110 using the liquid crystal steering device 300 to minimize the error signal calculated by the PID controller 420 to below the desired error threshold. For example, the PID controller 420 can direct the liquid crystal steering device 300 to steer the light at an angle θ in the positive first (+1$^{st}$) order by applying a voltage to the half waveplate 320 so that the light 390 passes through the half waveplate 320 without changing its polarization state. As explained above, no voltage is applied to the LCPG 200 to steer the light 380 in the +1$^{st}$ order. After the liquid crystal steering device 300 steers the light at the angle θ in the +1$^{st}$ order, the light detector 410 senses the coupling power in the waveguide 430. If the error increased, the PID controller 420 can direct the liquid crystal steering device 300 to diffract the light from the fiber 110 at an angle θ in the −1$^{st}$ order by not applying voltage to the half waveplate 320 and the LCPG 200.

Figure 5:
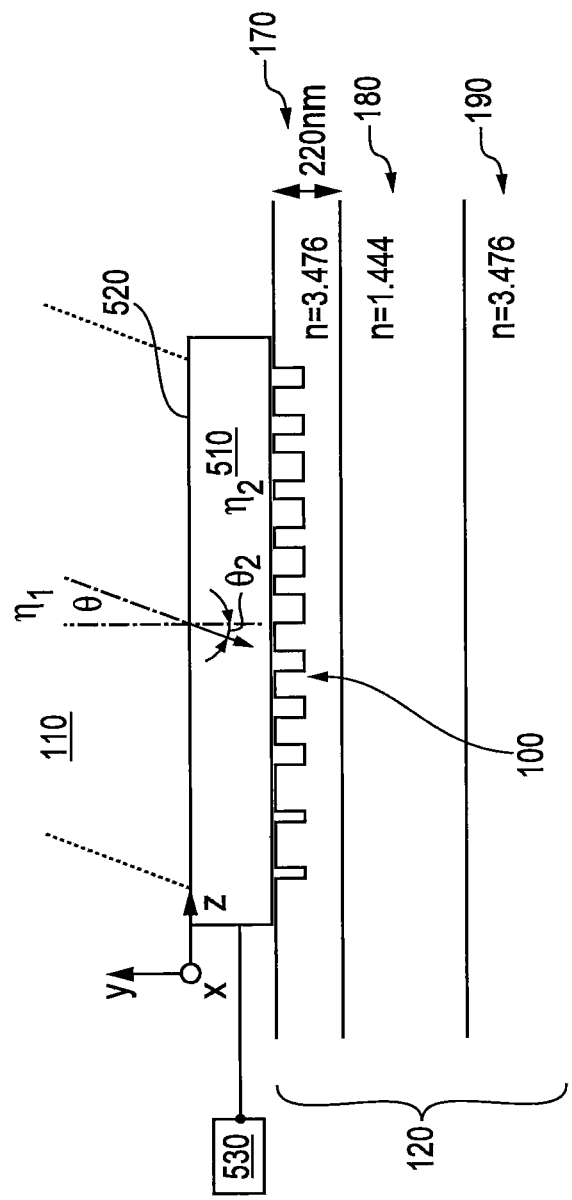
FIG. 5 shows a side view of another liquid crystal steering device in accordance with another example embodiment.

FIG. 5 shows a side view of a liquid crystal steering device 500 in accordance with another embodiment. The liquid crystal steering device 500 includes a liquid crystal waveplate 510 arranged between an optical fiber 110 and the optical integrated waveguide 170. The liquid crystal steering device 500 can be bonded between the optical fiber 110 and the waveguide 170 using, for example, double-sided tape adhesive. It should be appreciated that the embodiment is not limited solely to double-sided tape and that any suitable adhesive technique may be used, such as a UV cured epoxy or a thermally cured epoxy.

The liquid crystal waveplate 510 includes one or more liquid crystal layers, which can be nematic liquid crystal layers having a refractive index in the range of 1.414 to 2 for near-infrared red light. The liquid crystal waveplate 510 has a thickness of approximately 1.5 μm, or any thickness greater than the wavelength of the fiber 110. The size of the liquid crystal molecules in the liquid crystal waveplate 510 should be at least the width of the grating 100, and preferably twice the width of the grating 100. For example, if the grating 100 is on the order of 10 μm wide, the liquid crystals of the liquid crystal waveplate 510 should be 20 μm. The liquid crystal facet 520 facing up can be coated with an anti-reflective coating, unless an index matching layer, such as the index matching layer 160 of FIG. 3A, is between the fiber 110 and the liquid crystal waveplate 510.

Light from the fiber 110 is sent to the liquid crystal waveplate 510 where the light polarization is parallel with the orientation of the liquid crystal. When linearly polarized light from the fiber 110 impinges at the interface with the liquid crystal waveplate 510, it is partially reflected and partially refracted as shown in FIG. 5. This phenomenon is explained by Snell's law:

$$n_1 * \sin\theta_1 = n_2 * \sin\theta_2,$$

where $n_1$ is the refractive index of the fiber 110, $\theta_1$ is the angle of incidence of the incoming light from the fiber 110, $n_2$ is the refractive index of the liquid crystal waveplate 510, and $\theta_2$ is the angle of transmission of the light through the liquid crystal waveplate 510. When an electric or magnetic field from the field generating device 530 is applied to the liquid crystal waveplate 510, the orientation of the liquid crystal molecules is aligned parallel to the field and thus the refractive index of the liquid crystal waveplate 510 is changed with the rotated angle of the liquid crystal molecules. By varying the refractive index of the liquid crystal waveplate 510, the beam from the fiber 110 will change its angle of refraction. The minimum and maximum angles of refraction can be determined as follows:

$$\theta_{2,min} = \sin^{-1}\frac{n_1}{n_{2,min}}\sin\theta_1, \; \theta_{2,max} = \sin^{-1}\frac{n_1}{n_{2,max}}\sin\theta_1$$

where $n_{2,min}$ and $n_{2,max}$ are the minimum and maximum refractive indices, respectively, of the liquid crystal waveplate 510. For example, if the refractive index of the fiber 110, $n_1$=1, and the light from the fiber 110 enters the liquid crystal waveplate 510 at an angle $\theta_1$ of 16.7 degrees, the liquid crystal waveplate 510 can steer the beam a minimum angle of 8.26 degrees to 11.73 degrees, or within a range of 3.47 degrees.

It will be appreciated that the liquid crystal steering device 300 can be substituted with the liquid crystal steering system 500 in the fiber to chip steering system 400 for coupling the fiber 110 to the integrated optical waveguide 170. The optical power between the fiber 110 and the input waveguide 170 can be sensed at various diffraction angles of the liquid crystal waveplate 510 using the light detector 410 to determine a maximum sensed optical power. The maximum sensed optical power for the corresponding diffraction angle, wavelength and grating period is stored as an operating parameter of the steering system 500. In response to the detector signal converted by the light detector 410, the feedback loop generates an error signal that indicates a difference between the currently sensed optical power as represented by the detector signal and the stored maximum sensed optical power. When the PID controller 420 determines that the error signal is equal to or above a desired error threshold, the PID controller 420 steers the light from the fiber 110 using the liquid crystal waveplate 510 to minimize the error signal calculated by the PID controller 420 to below the desired error threshold by adjusting the electric field applied from the field generating device 530 to the liquid crystal waveplate 510.

While disclosed embodiments have been described in detail, it should be readily understood that the invention is not limited to the disclosed embodiments. Rather the disclosed embodiments can be modified to incorporate any number of variations, alterations, substitutions or equivalent arrangements not heretofore described.

What is claimed as new and desired to be protected by Letters Patent of the United States is:

1. A structure for optically aligning an optical fiber with an optical waveguide, comprising:
   an optical waveguide integrated on a chip and having a light coupling grating; and
   a switchable beam steering device bonded to said optical waveguide and comprising:
      a switchable liquid crystal polarization grating arranged in an optical path with said optical waveguide, said polarization grating being configured to actively steer an incoming light beam from said optical fiber into the coupling grating of said optical waveguide;
      a first waveplate bonded to said switchable liquid crystal polarization grating and configured to receive and selectively change a polarization state of an incoming light beam; and
   a voltage source for operating said switchable beam steering device to steer the incoming light beam; and
   wherein the switchable liquid crystal polarization grating and the first waveplate are located between the optical fiber and the optical waveguide, such that the incoming light beam from the optical fiber is incident on the switchable beam steering device.

2. The structure of claim 1, wherein said switchable liquid crystal polarization grating is configured to steer a circularly polarized beam received from said first waveplate into one of three diffraction orders.

3. The structure of claim 2, further comprising a second waveplate arranged between said optical fiber and said first waveplate, said second waveplate being configured to selectively change a linearly polarized beam received from the optical fiber into a circularly polarized beam.

4. The structure of claim 1, wherein said first waveplate is a half waveplate made of birefringent liquid crystal.

5. The structure of claim 3, wherein said second waveplate is a quarter waveplate.

6. The structure of claim 3, wherein said second waveplate is a three-quarters waveplate.

7. The structure of claim 4, wherein the voltage source is configured to apply a voltage greater than a threshold voltage to said polarization grating for selecting a zero diffraction order.

8. The structure of claim 4, wherein the voltage source is configured to apply a voltage to said first waveplate to allow a circularly polarized beam to pass through without changing the polarization state of the circularly polarized beam.

9. The structure of claim 3, wherein a facet of the second waveplate facing said optical fiber is coated with an antireflective coating.

10. The structure of claim 1, wherein said switchable beam steering device is bonded to said optical waveguide using a double-sided tape.

11. An integrated optical chip comprising:
    a liquid crystal steering device adapted to actively optically align an optical fiber to a first optical waveguide on the integrated optical chip, the steering device comprising a switchable liquid crystal polarization grating attached to the first optical waveguide and a half waveplate located between the optical fiber and the polarization grating;
    a waveguide sensor for detecting a coupling power between the optical fiber and the first optical waveguide; and
    a controller configured to actively control the steering device in response to the coupling power detected by the waveguide sensor; and
    wherein the switchable liquid crystal polarization grating and the half waveplate are located between the optical fiber and the first optical waveguide, such that an incoming beam from the optical fiber is incident on the liquid crystal steering device.

12. The integrated optical chip of claim 11, further comprising a second optical waveguide in proximity of said first optical waveguide for coupling an optical signal from said first optical waveguide to said waveguide sensor.

13. The integrated optical chip of claim 12, wherein the coupling between the first and second optical waveguides is by an evanescent wave.

14. The integrated optical chip of claim 12, wherein the waveguide sensor is a photodetector coupled to the second optical waveguide.

15. The integrated optical chip of claim 11, wherein the waveguide sensor is an optical transducer coupled to the first optical waveguide.

16. The integrated optical chip of claim 11, wherein the controller is a proportional-integral-derivative controller.

17. A liquid crystal steering device for aligning an optical fiber having a core with a first refractive index to an integrated optical chip, the steering device comprising:
    a liquid crystal waveplate having a second refractive index that is different from the first refractive index, the waveplate being attached to the integrated optical chip between the optical fiber and a grating coupler of the integrated optical chip, such that an incoming beam from the core of the optical fiber is incident on the liquid crystal waveplate; and
    an electric field source configured to apply an electric field to the waveplate to change the second refractive index and actively steer an optical signal from the optical fiber to the grating coupler.

18. The steering device of claim 17, wherein the waveplate comprises one or more liquid crystal layers.

19. The steering device of claim 18, wherein the liquid crystal layers are nematic.

20. The steering device of claim 17, wherein the waveplate has a thickness greater than a wavelength of the optical fiber.

21. The steering device of claim 17, wherein a facet of the waveplate adjacent to the optical fiber has an antireflective coating.

22. The structure of claim 1, wherein said voltage source applies selected voltages to said first waveplate and polarization grating to steer the incoming light beam.

23. The structure of claim 22, wherein said voltage source comprises a controller which determines a light intensity within said optical waveguide and controls voltages applied to said first waveplate and polarization grating to increase the light intensity in said optical waveguide.

24. The structure of claim 23, wherein said first waveplate is selectively operable by said voltage source to selectively change or not change the polarization of light passing therethrough.

25. The integrated optical chip of claim 12, wherein the first optical waveguide has a refractive index, the integrated optical chip further comprising a voltage source for applying an electric field to the first optical waveguide to change the refractive index and optical coupling between the first and second optical waveguides.

26. The integrated optical chip as in claim 25, wherein the voltage source is operable to turn the optical coupling between the first and second optical waveguides on or off.

27. The steering device as in claim 17, further comprising a waveguide sensor for detecting optical power passing through the grating coupler, and a controller responsive to the sensed optical power for operating the voltage source to steer the optical signal.

* * * * *